United States Patent
Li et al.

(10) Patent No.: US 10,113,611 B2
(45) Date of Patent: Oct. 30, 2018

(54) TORSIONAL VIBRATION DAMPER AND ENGINE ASSEMBLY INCLUDING THE SAME

(71) Applicant: Ford Global Technologies LLC, Dearborn, MI (US)

(72) Inventors: Bruce Li, Nanjing (CN); Bin Yin, Nanjing (CN); Dallis Sun, Troy, MI (US); Baocheng Sun, Beverly Hills, MI (US); Jagadish Sorab, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/691,265

(22) Filed: Aug. 30, 2017

(65) Prior Publication Data
US 2018/0066729 A1    Mar. 8, 2018

(30) Foreign Application Priority Data
Sep. 6, 2016 (CN) .......................... 2016 1 0806008

(51) Int. Cl.
| | |
|---|---|
| *F16F 15/26* | (2006.01) |
| *F16C 3/06* | (2006.01) |
| *F02B 77/08* | (2006.01) |
| *F16C 3/08* | (2006.01) |
| *F16C 3/20* | (2006.01) |

(52) U.S. Cl.
CPC .............. *F16F 15/26* (2013.01); *F02B 77/08* (2013.01); *F16C 3/06* (2013.01); *F16C 3/08* (2013.01); *F16C 3/20* (2013.01)

(58) Field of Classification Search
CPC .. F16F 15/22; F16F 15/26; F16F 1/361; F16F 3/06; F16C 3/06; F16C 3/20
See application file for complete search history.

(56) References Cited

U.S. PATENT DOCUMENTS 2,083,561 A * 6/1937 Griswold ............ F16F 15/1442
                                                           74/574.2
3,462,136 A * 8/1969 Rumsey .................. F16F 1/326
                                                             188/268

(Continued)

FOREIGN PATENT DOCUMENTS

| CN | 204327856 U | 5/2015 |
| DE | 536929 C | 10/1931 |
| FR | 278472881 | 10/2004 |

OTHER PUBLICATIONS

"Internal Crankshaft Damper", 2002, Friedrich Gerhardt/Christian Fechler/Steffen Lehmann/Hermann Langeneckert.

*Primary Examiner* — Long T Tran
(74) *Attorney, Agent, or Firm* — Julia Voutyras; Mohr IP Law Solutions, PC

(57) ABSTRACT

A torsional vibration damper mounted at a crankshaft of an engine is provided. The torsional vibration damper comprises a hub having a first mounting surface and a second mounting surface opposite to the first mounting surface, an inertia ring and an elastomer element disposed between the hub and the inertia ring. The hub includes a first mounting hole configured to receive the crankshaft, and at least one slot spaced apart from the first mounting hole. The slot is configured such that a center-of-gravity of the torsional vibration damper is offset from a central axis of the crankshaft.

18 Claims, 5 Drawing Sheets

(56) References Cited

U.S. PATENT DOCUMENTS

| | | | |
|---|---|---|---|
| 4,257,370 A | 3/1981 | Kasting | |
| 4,293,136 A * | 10/1981 | George | F16F 15/1442 |
| | | | 277/565 |
| 6,883,467 B2 | 4/2005 | Lehmann et al. | |
| 10,030,757 B2 * | 7/2018 | Manzoor | F16H 55/36 |
| 2007/0295569 A1 * | 12/2007 | Manzoor | F16F 15/124 |
| | | | 188/379 |
| 2017/0292583 A1 * | 10/2017 | Manzoor | F16F 15/124 |

* cited by examiner

TORSIONAL VIBRATION DAMPER AND ENGINE ASSEMBLY INCLUDING THE SAME

RELATED APPLICATION

This application claims the benefit of Chinese Patent Application No.: CN 201610806008.6 filed on Sep. 6, 2016, the entire contents thereof being incorporated herein by reference.

FIELD

The present disclosure relates to a torsional vibration damper of an engine, in particular, a torsional vibration damper integrated inside an engine block.

BACKGROUND

In conventional technique, a torsional vibration damper pulley has been used to damp or attenuate the torsional vibrations generated during the operation of an internal combustion engine. The damper pulley is driven by the internal combustion engine. In a front end accessary drive (FEAD) system, the damper pulley is also used to provide power to front end accessories, such as an alternator, a water pump, and an air-conditioning compressor. In addition, the internal combustion engine utilizes a balance shaft assembly or adds timed force unbalance on flywheel to attenuate the vibration caused by the movement of a connecting rod.

With the development of the technology, for some hybrid vehicle employing a high voltage battery, an electronic water pump and an AC conditioner compressor may be used to improve thermal efficiency. Thus, it is possible to integrate a vibration damper into an engine block under non-FEAD circumstance. DE patent 536929C discloses a torsional vibration damper disposed on a crank web. U.S. Pat. No. 6,883,487B2 discloses a torsional vibration damper integrated into a crank web. However, the torsional vibration dampers disclosed in the two patents have complicated structures, which includes a number of springs and couplings.

SUMMARY

According to one aspect of the present disclosure, a torsional vibration damper mounted at a crankshaft of an engine is provided. The torsional vibration damper comprises a hub having a first mounting surface and a second mounting surface opposite to the first mounting surface, an inertia ring and an elastomer element disposed between the hub and the inertia ring. The hub includes a first mounting hole configured to receive the crankshaft, and at least one slot spaced apart from the first mounting hole. The at least one slot is configured such that a center-of gravity of the torsional vibration damper is offset the central axis of the crankshaft to balance torsional motions.

In one embodiment, the first mounting hole is recessed from the second mounting surface.

In another embodiment, the torsional vibration damper further comprises a key element. An inner wall of the first mounting hole includes a key aperture adjacent to the second mounting surface and configured to receive the key element. The key element is configured to secure the torsional vibration damper to the crankshaft at a predetermined position to balance the torsional motions and harmonics vibration.

In another embodiment, the hub further includes a second mounting hole substantially concentric with the first mounting hole and configured to receive a fastener to secure the torsional damper to the crankshaft.

In another embodiment, a diameter of the second mounting hole is less than a diameter of the first mounting hole.

In another embodiment, the at least one slot includes a first slot and a second slot adjacent to the first slot. The first slot and the second slot are located substantially in a semicircle of the hub.

In another embodiment, the elastomer element is made from rubber.

In another embodiment, the hub is formed from a solid metal plate.

In another embodiment, the hub is formed from two metal sheets.

According to another aspect of the disclosure, an engine assembly is provided. The engine assembly comprises an engine block; a front cover on the engine block; a crankshaft in the engine block and a torsional vibration damper connected to one end of the crankshaft and disposed inside the engine block. The torsional vibration damper includes a hub; an inertia ring; and an elastomer element disposed between the hub and the inertia ring. The hub includes a first mounting surface, a second mounting surface opposite to the first mounting surface and facing the crankshaft, a first mounting hole, at least one slot spaced apart from the first mounting hole. The first mounting hole is configured to receive one end of the crankshaft, and the slot is configured such that a center-of-gravity of the torsional vibration damper is offset from a central axis of the crankshaft.

In one embodiment, the first mounting hole is recessed from the second mounting surface.

In another embodiment, the torsional vibration damper further includes a key element. An inner wall of the first mounting hole includes a first key aperture and the crankshaft includes a second key aperture corresponding to the first aperture. The key element is disposed between the first and second apertures to secure the torsional vibration damper to the crankshaft at a predetermined position such that the torsional vibration damper is timed to reduce the torsional vibration of the crankshaft.

In another embodiment, the second key aperture is formed with a hemispheric shape.

In another embodiment, the key element includes a key body along the central axis of the crank and a hemispheric protrusion, and the key body is received in the first key aperture and the hemispheric protrusion is received in the second key element.

In another embodiment, the engine assembly further comprises a fastener to secure the torsional damper to the crankshaft. The hub further includes a second mounting hole substantially concentric with the first mounting hole and configured to receive the fastener.

In another embodiment, a diameter of the second mounting hole is less than a diameter of the first mounting hole.

In another embodiment, the one end of the crankshaft includes a third mounting hole to receive the fastener.

In another embodiment, the fastener is a screw bolt.

One or more advantageous features as described herein are believed to be readily apparent from the following detailed description of one or more embodiments when taken in connection with the accompanying drawings.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
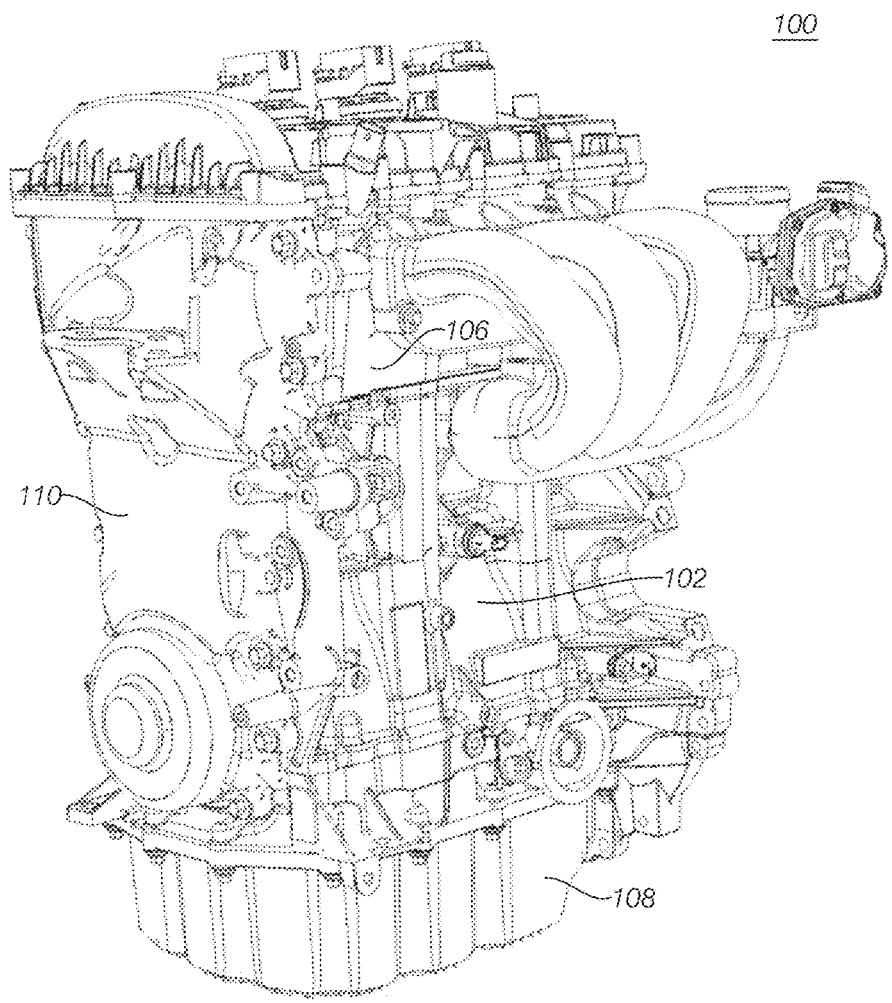
FIG. 1 depicts a perspective view of an engine assembly according one or more embodiments of the present disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

For a conventional vehicle, it is common to integrate a torsional vibration damper outside a front cover of the engine block such that it can be used to drive front end accessories) such as a water pump, an air conditioning compressor. However, this configuration can have package issues, a problem of oil leakage and can affect the compactness design of an engine assembly. In a vehicle having high voltage battery (e.g., a hybrid vehicle), it is possible to remove the front end accessary drive (FEAD) such that the torsional vibration damper can be placed inside an engine block.

Figure 2:
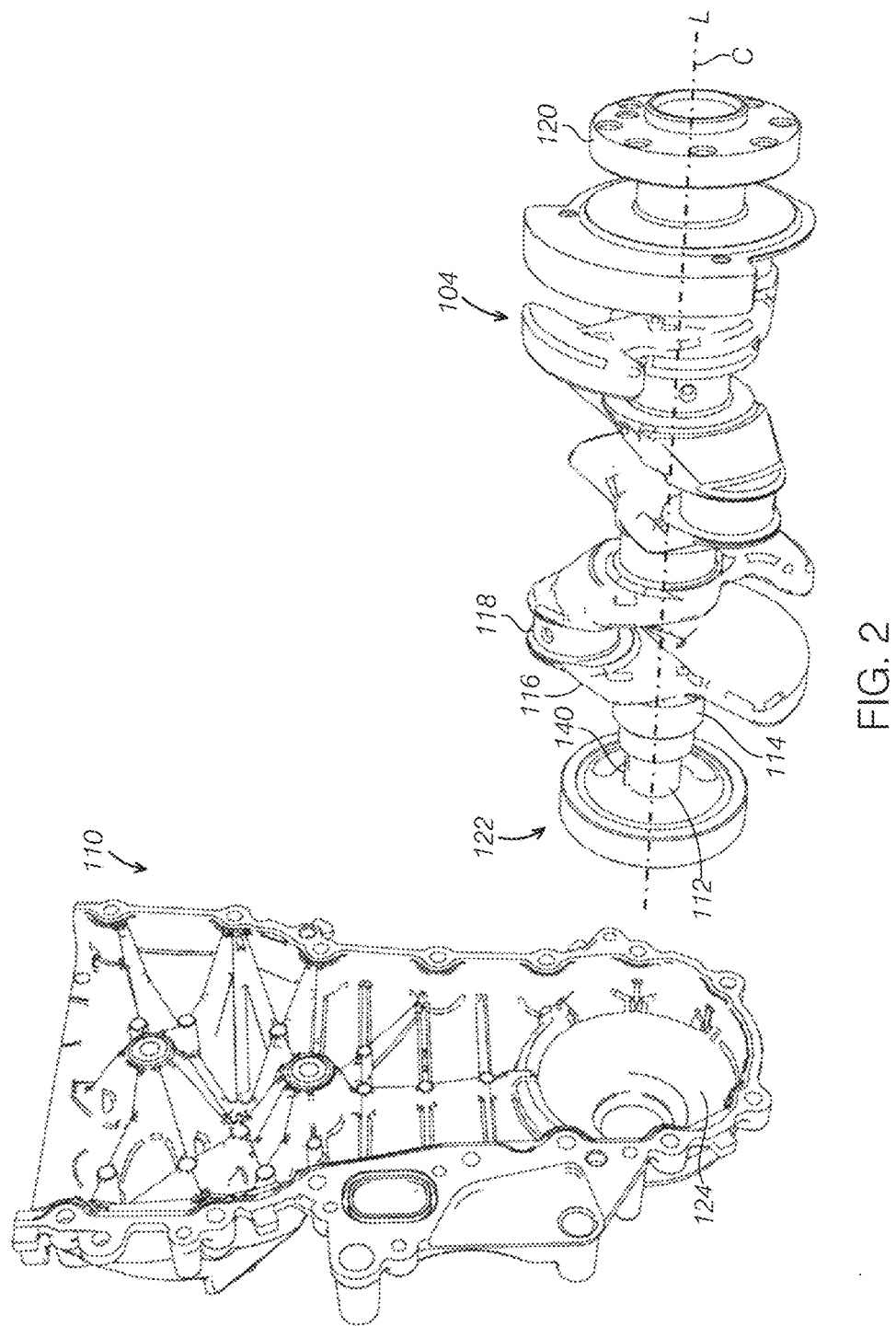
FIG. 2 depicts a partially exploded view of the engine assembly referenced in FIG. 1.

Referring to FIG. 1 and FIG. 2, FIG. 1 depicts a perspective view of an engine assembly 100 according one or more embodiments of the present disclosure. FIG. 2 depicts a partially exploded view of the engine assembly 100 in FIG. I. The engine assembly 100 includes an engine block 102, a crankshaft 104 positioned in the engine block 104, a cylinder head 106 mounted onto a top of the engine block 102, an oil sump 108 connecting to a bottom of the engine block 102 and a front cover 110 mounted to a front f the engine block 102. In one or more embodiments, the crankshaft 104 includes a front end (free end) 112, a plurality of main journals 114, a plurality of crank webs 116 positioned between the main journal 114, a plurality of crank pins 118 positioned between the crank webs 116 and a rear end (an output end) 120. In one or more embodiments, the engine assembly 100 includes a torsional vibration damper 122 mounted to one end of the crankshaft 104, such as a free end 112. The torsional vibration damper 122 is positioned inside the engine block 102 and adjacent to the front cover 110. The front cover 110 includes a recess or a receiving space 124 configured to receive at least a portion of the torsional vibration damper 122. The receiving space 124 may be extruded from a maid body of the front cover and away from the crank along an axial direction L (i.e. a center axis C of the crankshaft 104). The engine assembly 100 further includes a flywheel, a torque converter, a clutch, a transmission and other parts rotating with engine (not shown). The mass of these parts counteracts torsional crank motions. Specifically, the torsional vibration damper 122 is configured to reduce harmonic vibration and/or torsional motions.

Figure 3:
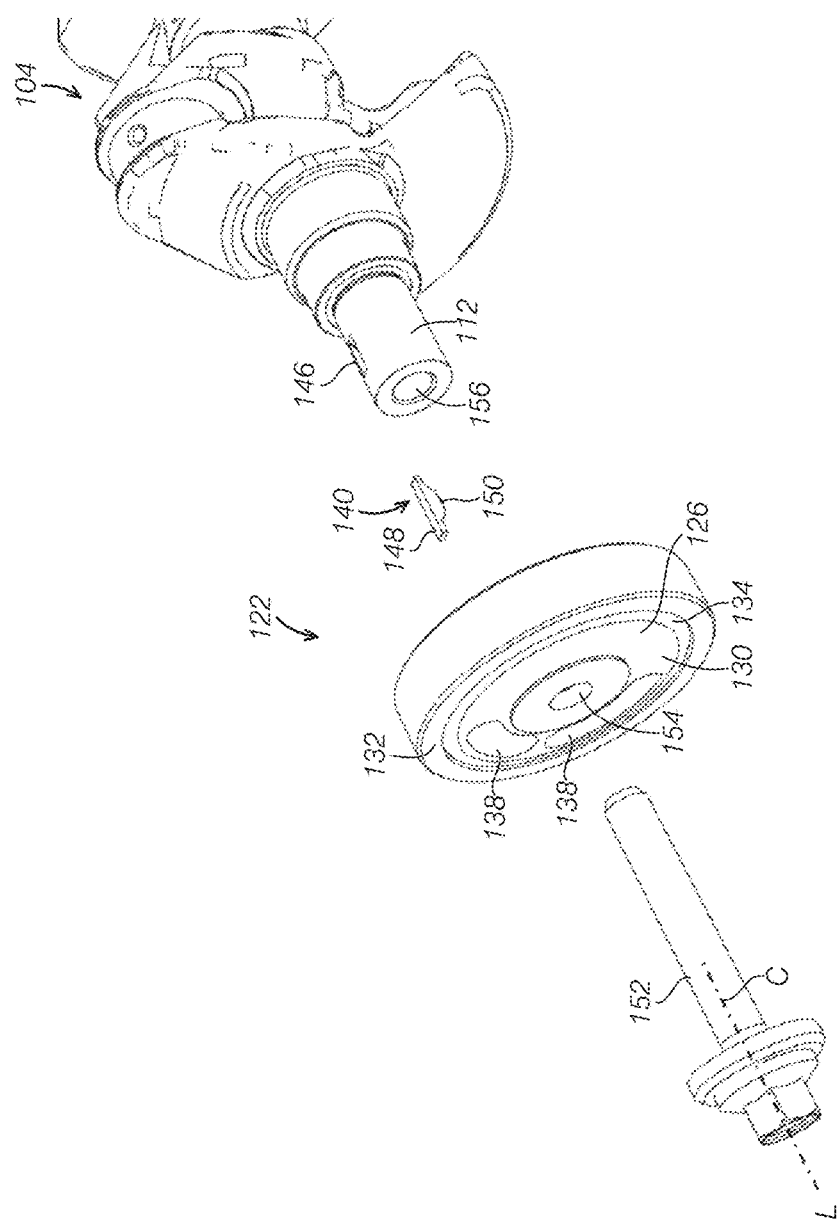
FIG. 3 depicts an exploded view of a crank and the vibration damper referenced in FIG. 2.
Figure 4A:
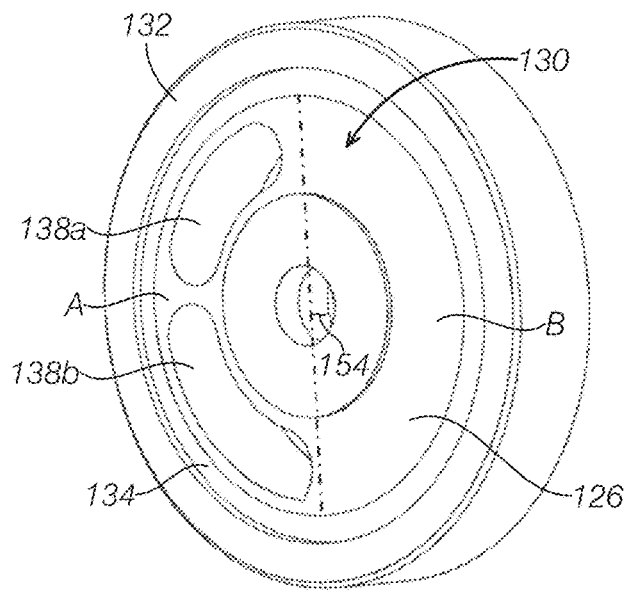
FIG. 4A depicts a perspective view of the vibration damper in FIG. 3.
Figure 4B:
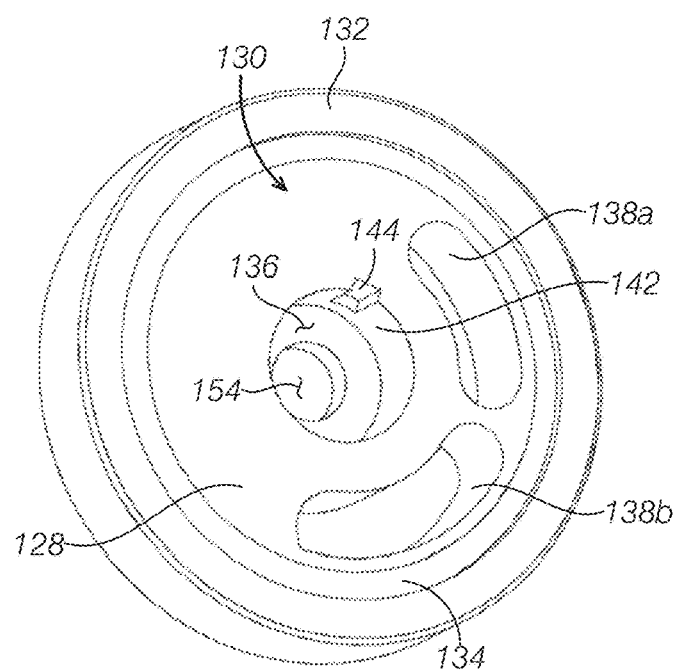
FIG. 4B depicts a perspective of view of the vibration damper in FIG. 3.

Referring to FIG. 3 and in combination with FIG. 4A and FIG. 4B, FIG. 3 depicts an exploded view of the crank and the vibration damper referenced in FIG. 2. FIG. 4A depicts a perspective view of the vibration damper in FIG. 3. FIG. 4B depicts another view of the vibration damper referenced in FIG. 3. In one or more embodiments, the torsional vibration damper 122 includes a hub 130 having a first mounting surface 126 and a second mounting surface 128, an inertia ring 132, and an elastomer element 134 disposed between the hub 130 and the inertia ring 132. Since there is no need to drive other front end accessories by the torsional vibration damper 122, there is flexibility in selection of the mass of torsional vibration damper 122 to balance a torsional motion and/or absorb harmonic vibration. For instance, the hub 130 may be configured with one or more slots. The size and location of the slots may be configured to tune a natural frequency of the torsional vibration damper to be about equal to that of the crank to reduce harmonic vibration and/or balance a torsional motion. With further reference to FIG. 3, FIG. 4A and FIG. 4B, in one or more embodiments, the hub 130 may include a first mounting hole 136 to receive the crankshaft 104 and at least one slot 138 spaced apart from the first mounting hole 136. The slot 138 is configured such that the center-of-gravity of the torsional vibration damper 122 is offset from the central axis C of the crankshaft 104 to balance the torsional motion and/or reduce harmonic vibration. In one or more embodiments and as illustrated in FIG. 4A, the hub 130 may include a first slot 138a and a second slot 138b adjacent to the first slot 138a. The first slot 138a and the second slot 138b are located substantially in a semicircle A of the hub 130. It should be understood that the first slot 138a and the second slot 138b may be located in a semicircle A and a semicircle B, respectively while still results in a center-of-gravity of the torsional vibration damper 122 offset from the central axis of the crankshaft 104. Further, the size and shape of the slot 138 or a distance between the first and second slots 138a, 138b may cause a change on the position the center-of-gravity G. The torsional vibration damper 122 having a center-of-gravity G offset from the central axis of the crankshaft may function to balance weight. Thus, a balance bar or balance disk is not required to be assembled in the engine assembly 100 to balance weight. Thus, it is possible to reduce cost while maintaining an acceptable NVH level. In the depicted embodiment, the torsional vibration damper 122 may be a circle and it can function to balance weight with inclusion of the slot 138.

In one or more embodiments, the elastomer element 134 may be made from rubber. The hub 130 may be formed from solid metal plate, such as integrally formed by casting to enhance the part strength and production efficiency. In some embodiments, the hub 130 may also be formed from two pieces of metal plate.

The inertia ring 132 connected to an outer rim of the elastomer element 134 has a certain mass. When the engine is at work, an assembly connected to the crank rotates as a single piece. When the combustion event occurs and the harmonic is at a narrow frequency, the inertia ring 132 is resonating on the elastomer member 134 and causes torsion and rebound of the elastomer element 134 in response to a rotation speed of the assembly. The elastomer element 134 absorbs vibration. The movement of the mass of the torsional vibration damper 122 reduces the frequency band including the most adverse harmonics. That is, the mass counteracts the torsional crank motions and in concert with the energy dissipating element absorbs the harmonics vibrations.

The torsional vibration damper 122 further includes a key element to secure the torsional vibration damper 122 to the crankshaft 104 at a predetermined position to adjust or time the torsional vibration damper 122. Now referring to FIGS. 4A-4B and with further reference to FIG. 5, in one or more embodiments, the first mounting hole 136 may be recessed from the second mounting surface 128 with a predetermined distance. An inner wall 142 of the first mounting hole 136 includes a first key aperture 144 adjacent to the second mounting surface 128 and configured to receive the key element 140. The second mounting surface 128 is shown to face the crankshaft 104. Further referring to FIG. 3 and FIG. 5, the crankshaft 104 includes a second key aperture 146 positioned at the free end 112 and corresponding to the first key aperture 144 to receive the key element 140. The key element 140 is disposed between the first key aperture 144 and the second key aperture 146 to secure the torsional vibration damper 122 to the crankshaft 104 at a predetermined position such that the torsional vibration damper 122 is timed to balance the torsional motions of the crankshaft 104. In one or more embodiments, the torsional vibration damper 122 being timed means the center-of-gravity of the torsional vibration damper 122 is fixed at a predetermined position or angle relative to the axis C of the crankshaft 104. In one or more embodiments, the second key aperture 146 may have a hemispheric shape. The key element 140 includes a key body 148 extends at a direction L of the central axis of the crankshaft and a hemispheric protrusion 150 extending from the key body 148 toward the central axis C. The key body 148 is received in the first key aperture 144 and the protrusion 150 is received in the second key aperture 146.

When the torsional vibration damper 122 is secured by the key element 140, the offset mass of the torsional vibration damper 122 is determined, thus the natural frequency of the torsional vibration damper 122 is determined. The natural frequency of the torsional vibration damper 122 may be set to be about equal to that of the crankshaft 104. Computer assist engineering (CAE) may be used to determine the configuration of the torsional vibration damper 122, such as the shape, size and location of the slot in the hub 130, and the position of the key element 140 relative to the slot to optimize and verify the structure of the torsional vibration damper 122.

In one or more embodiments, the engine assembly 100 further comprises a fastener 152 to secure the torsional damper 122 to the crankshaft 104. The hub 130 further includes a second mounting hole 154 substantially concentric with the first mounting hole 136 and configured to receive the fastener 152. A diameter of the second mounting hole 154 is less than a diameter of the first mounting hole 136. The one end of the crankshaft 104 (e.g., a free end) includes a third mounting hole 156 along the axial direction L to receive the fastener 152. In one or more embodiments, the fastener 152 is a screw bolt.

Figure 5:
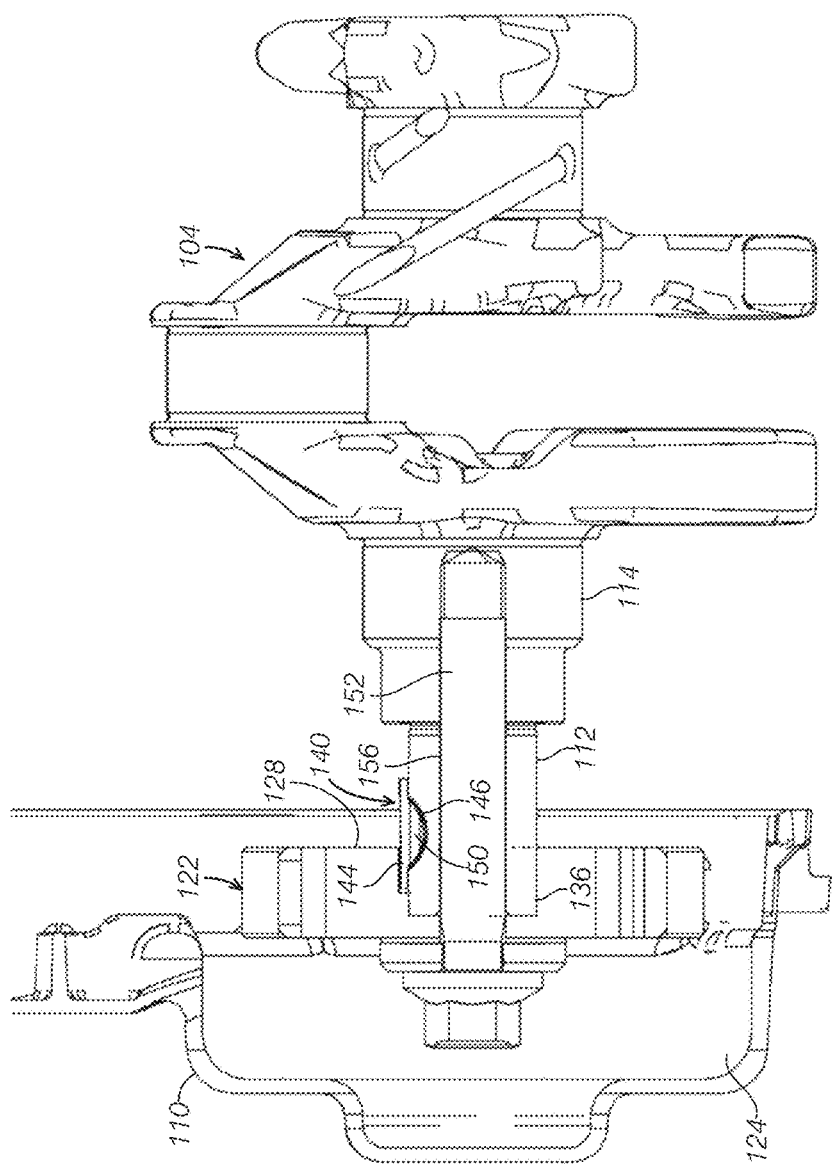
FIG. 5 depicts a partial cross-sectional view of the engine assembly in FIG. 1 at an assembled position.

Continuing with FIG. 5, a partial cross-sectional view of the engine assembly in FIG. 1 is illustrated at an assembled position. In FIG. 5, the engine block 102 is removed for clarity. The key body 148 of the key element 140 is received in the first key aperture 144 and the protrusion 150 is received in the second key aperture 146 to time the center-of-gravity G of the torsional vibration damper 122 around circumference surrounding the axis C of the crankshaft 104. The free end 112 of the crankshaft 104 is received in the first mounting hole 136. The fastener 152 sequentially passes through the second mounting hole 154, the first mounting hole 136 and the third mounting hole 156 to secure the torsional vibration damper 122 to the crankshaft 104. In o or more embodiments, the third mounting hole 156 may extend into the main journal 114 of the crankshaft 104. In one or more embodiments, the fastener 152 and the torsional vibration damper may be at least partially received in the receiving space 124 of the front cover 110.

In the engine assembly of the present disclosure, the torsional vibration damper is disposed inside the engine block and adjacent to the front cover and thus a dynamic seal is not necessary, the assembling process is simplified, the engine package space is decreased and the cost is reduced. Further, the hub of the torsional vibration damper is configured with at least one slot such that the center-of-gravity of the torsional vibration damper is offset from a central axis of the crankshaft to balance the torsional motions of the crankshaft to eliminate the need for a balance rod or balance plate. Furthermore, the hub is formed with a key aperture to fit the key element such that the center-of-gravity of the torsional vibration damper is timed to balance the torsional motions of the crankshaft. The slot is positioned to adjust the center-of-gravity of the torsional vibration damper, and the key aperture can be configured to adjust the timed force unbalance. Thus, the torsional vibration damper of the present disclosure can apply to different crankshaft configurations. The torsional vibration damper of the present disclosure has a simple structure and possesses multiple functions, including but not limited to balancing weight, timing the torsional vibration damper.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A torsional vibration damper mounted at a crankshaft of an engine, comprising:
   a hub including:
      a first mounting surface, a second mounting surface opposite to the first mounting surface,
a first mounting hole configured to receive the crankshaft, and
at least one slot spaced apart from the first mounting hole;
an inertia ring; and
an elastomer element disposed between the hub and the inertia ring;
wherein the at least one slot is configured such that a center-of-gravity of the torsional vibration damper is offset from a central axis of the crankshaft.

2. The torsional vibration damper of the claim 1, wherein the first mounting hole is recessed from the second mounting surface.

3. The torsional vibration damper of claim 1, further comprising a key element, wherein an inner wall of the first mounting hole includes a key aperture adjacent to the second mounting surface and configured to receive the key element, and wherein the key element secures the torsional vibration damper to the crankshaft at a predetermined position to balance the torsional vibration.

4. The torsional vibration damper of claim 1, wherein the hub further includes a second mounting hole substantially concentric with the first mounting hole and configured to receive a fastener to secure the torsional damper to the crankshaft.

5. The torsional vibration damper of claim 4, wherein a diameter of the second mounting hole is less than a diameter of the first mounting hole.

6. The torsional vibration damper of claim 3, wherein the at least one slot includes a first slot and a second slot adjacent to the first slot, and wherein the first slot and the second slot are located substantially within a semicircle of the hub.

7. The torsional vibration damper of claim 1, wherein the elastomer element is made from rubber.

8. The torsional vibration damper of claim 1, wherein the hub is formed from a solid metal plate.

9. The torsional vibration damper of claim 1, wherein the hub is formed from two metal sheets.

10. An engine assembly, comprising:
an engine block;
a front cover on the engine block;
a crankshaft in the engine block;
a torsional vibration damper connected with one end of the crankshaft, disposed inside the engine block and adjacent to the front cover, the torsional vibration damper includes:
a hub including a first mounting surface, a second mounting surface opposite to the first mounting surface and facing the crankshaft, a first mounting hole, and at least one slot spaced apart from the first mounting hole;
an inertia ring; and
an elastomer element disposed between the hub and the inertia ring,
wherein the first mounting hole is configured to receive the one end of the crankshaft, and the at least one slot is configured such that a center-of-gravity of the torsional vibration damper is offset from a central axis of the crankshaft.

11. The engine assembly of claim 10, wherein the first mounting hole is recessed from the second mounting surface.

12. The engine assembly of claim 10, wherein the torsional vibration damper further includes a key element, wherein an inner wall of the first mounting hole includes a first key aperture and the crankshaft includes a second key aperture corresponding to the first aperture, wherein the key element is disposed between the first and second apertures to secure the torsional vibration damper to the crankshaft at a predetermined position such that the torsional vibration damper is timed to reduce the torsional vibration of the crankshaft.

13. The engine assembly of claim 12, wherein the second key aperture have a hemispheric shape.

14. The engine assembly of claim 13, wherein the key element includes a key body at a direction of the central axis of the crankshaft and a hemispheric protrusion extending from the key body toward the central axis of the crankshaft, and wherein the key body is received in the first key aperture and the hemispheric protrusion is received in the second key element.

15. The engine assembly of claim 10, further comprising a fastener to secure the torsional damper to the crankshaft, wherein the hub further includes a second mounting hole substantially concentric with the first mounting hole and configured to receive the fastener.

16. The engine assembly of claim 15, wherein a diameter of the second mounting hole is less than a diameter of the first mounting hole.

17. The engine assembly of claim 16, wherein the one end of the crankshaft includes a third mounting hole to receive the fastener.

18. The engine assembly of claim 17, wherein the fastener is a screw bolt.

* * * * *